Oct. 5, 1971    R. S. ARBON    3,609,880
IMPROVEMENTS IN OR RELATING TO DATA PROCESSING DEVICES
Filed Oct. 14, 1969    7 Sheets-Sheet 1

INVENTOR
ROBERT S. ARBON

BY
Kirschstein, Kirschstein, Ottinger & Frank

ATTORNEYS

Oct. 5, 1971  R. S. ARBON  3,609,880
IMPROVEMENTS IN OR RELATING TO DATA PROCESSING DEVICES
Filed Oct. 14, 1969  7 Sheets-Sheet 2

Fig.2

INVENTOR
ROBERT S. ARBON

BY
ATTORNEYS

United States Patent Office 3,609,880
Patented Oct. 5, 1971

3,609,880
IMPROVEMENTS IN OR RELATING TO DATA PROCESSING DEVICES
Robert Stanley Arbon, Watford, England, assignor to Structural Communication Systems Limited, London, England
Filed Oct. 14, 1969, Ser. No. 866,194
Claims priority, application Great Britain, Oct. 15, 1968, 48,939/68
Int. Cl. G09b 7/08
U.S. Cl. 35—9 R       13 Claims

ABSTRACT OF THE DISCLOSURE

A data processing device having particular application as a teaching machine. A data card contains pre-punched control data for one question and a pre-scored response data field in which the student records an attempt at the question. This is done in a separate cardholder which identifies the pre-scorings with information items of an associated text. Having "punched" out a response the student inserts the card in the processor and operates an assessment lever. A control carriage scans the control data making a series of tests on the response attempt. An address for remedial or next-question information results from the overall assessment of the response attempt on the basis of the series of tests.

---

This invention relates to data processing devices for correlating two sets of data which may not be identical but in which one may specify certain criteria for the other. Although clearly there is a wide range of possible applications of such related sets of data one particular application is in the field of teaching machines.

Patent application No. 611,728, filed Jan. 25, 1967 and now Patent No. 3,528,181, granted Sept. 15, 1970 is directed to a teaching machine which comprises a student's control and response unit and a visual display unit for presenting information, questions, comments etc. An array of buttons in the response unit corresponds to an array of information elements and the student may construct a response to a displayed question or problem by operating a selection of the buttons. The response is assessed against various criteria and the display is controlled automatically to provide appropriate information or comment.

In its application to teaching machines the present invention provides basically comparable analysis capabilities to those of the above machine with a lesser degree of automaticity and a corresponding increase in flexibility.

According to the present invention, a data processing device adapted to receive two binary data field stores comprises circuit means responsive to data in one field to select from data in the other field and make a quantitive assessment of the data so selected.

The device may include means for providing an electrical weighting unit in respect of each data bit selected from said other field having a predetermined one of two binary values, means for providing an electrical reference quantity in response to reference data included in said one field, and balance means for comparing the aggregate value of said weighting units with said reference quantity and providing an indication of the result.

Inverse outputs are preferably provided by said balance means, means then being provided for selecting one or the other of said outputs in response to data included in said one field.

The device may include means for scanning said one field of data and providing a balance result in respect of each of a plurality of data words contained in said one data field.

The device may be adapted to receive a data card in which each of said two data fields comprises a respective area of punched and unpunched hole locations, and may include first and second contact carriages arranged to scan said two data fields respectively, and a contact plate having surface contacts with which spring contacts on said contact carriages make sliding engagement, said data card lying between the contact plate and the contact carriages and permitting engagement between said spring and surface contacts only at hole locations, so that the two values of a data bit are represented by an electrical connection between a spring contact and a surface contact, and by no such electrical connection, respectively.

The balance means preferably comprises a bridge circuit having a first bank of resistors adapted to be selectively connected in parallel with one arm and a second bank of resistors adapted to be selectively connected in parallel with an opposing arm, the first bank of resistors each having in series therewith a contact of each of the first and second contact carriages, in such manner that resistors of said first bank having closed contacts in said first and second contact carriages are connected in parallel with said one arm and are balanced against said second bank of resistors which are selected by contacts in said first carriage only.

A teaching machine may comprise such a data processing device which may be adapted to receive a data card in which said one field comprises a plurality of pre-punched control data words and said other field comprises pre-scored response bit locations for punching by a student, each response bit being identifiable with a respective item of information having significance in the subject to be taught, so that an answer by a student can be constructed as a data word in said other field by punching a selected plurality of said response bit locations, the answer being assessed in relation to each control data word, and an address indication being produced in response to one such assessment, the address indication being a reference to remedial or other information appropriate to the result of the assessment.

A data processing device employed as a teaching aid or so-called teaching will now be described, by way of example, with reference to the accompanying drawings, of which

FIG. 2 is a layout of a data card showing control and response data fields;

Figure 1:
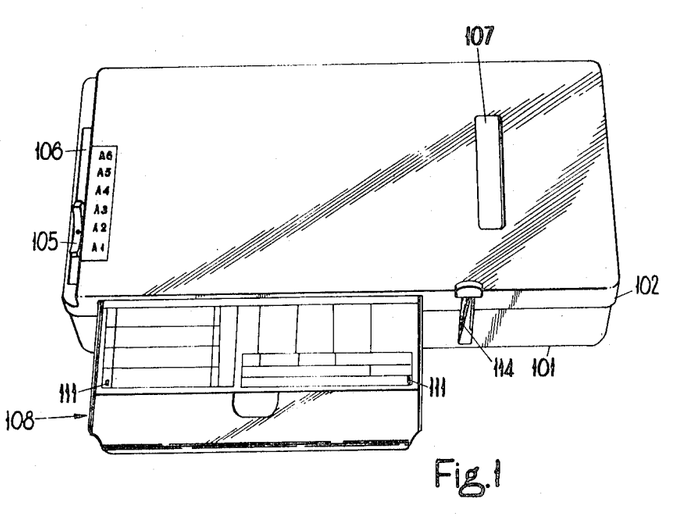
FIG. 1 is a perspective view of the device showing a data card positioned for insertion.
Figure 6:
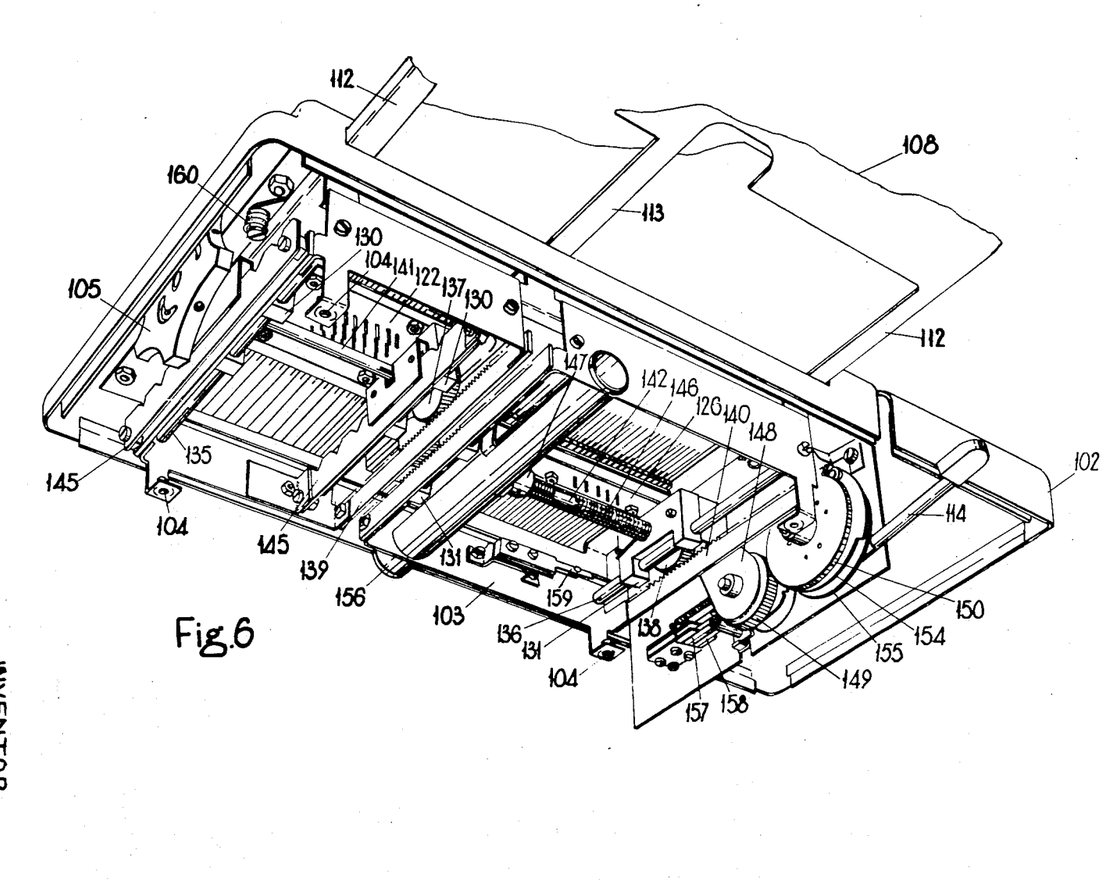
FIG. 6 is an underneath perspective view of the device with the lower part of the casing and part of the circuitry removed.

Referring now to the drawings, the device comprises a self-contained box as shown in FIG. 1 having dimensions approximately 12" x 6" x 3". The box has a main lower part 101 and a lid 102 which are held together by screws engaging a main frame 103 within the box. Fixing bushes 104 for the lower box part 101 are shown in FIG. 6.

At the left hand side of the device is an index wheel 105 which is operable by the student and drives a response carriage between click-stop positions identified by the reference A1–A66 along the edge of a slot 106 from which the index wheel projects. A mark on the wheel is aligned with the appropriate reference in each of six positions of the wheel, the six positions corresponding to six attempts an answer by the student.

Towards the right hand side of the lid 102 an address indicator 107 is positioned, this comprising a "tens" column and a "units" column of digits which are illuminated appropriately to direct the student to a particular page or section of a study manual associated with the device.

In the front of the lid 102 a sheet metal drawer 108 is fitted. This drawer is of such a length as to accept a standard 80-column punched data card as shown in FIG. 1. The standard card has twelve rows which will be numbered from the far edge of the card as shown in FIGS. 1 and 2. The standard eighty columns will be numbered from left to right in FIGS. 1 and 2.

The card is located on the drawer 108 by pegs 111 which engage in holes in row twelve, columns 1 and 80. As shown in FIG. 6, the drawer is largely cut away where the card rests, leaving only side supports 112, an intermediate support 113 and the front part of the drawer to support the card. The sides of the drawer are turned upwards to act as guides and the front edge is turned downwards to provide a finger hold in pulling it out. A third locating peg 111 may be provided on the intermediate support part 113 of the drawer 108, this peg locating in a hole in row twelve, column 32 which column is not otherwise used. Column 32 being off-centre, such a third locating peg 111 prevents the card being inserted face downwards.

Finally invisible on the outside of the device in FIG. 1 is an operating lever 114 which is spring biased into the upper position shown in that figure. The lever 114 protrudes through a slot 115 in the lower box part 101 and in the lid 102 (the latter slot being shown in FIG. 6).

Referring now to FIG. 2, this shows the standard data card divided into two data fields a pre-scored response data field on the left and a pre-punched control data field on the right. Below the control data field is a block in which the subject or study unit number is punched and spaces are provided for entry of the school, form and student's name.

A study manual associated with the device comprises material for a lesson together with a number of questions. The initial information or "presentation" may be a revision of a previous conventional lecture rather than an original introduction to the subject. Associated with the presentation is an array of information elements on a page, each element being a single fact, a statement, concept or such like which the author of the programme will have chosen for its particular significance in the context of the presentation material. The device will accommodate responses based on up to twenty-five information elements all of which, in general, will have some degree of relevance to the presentation material. As a part of a response to a problem, therefore, each element may be essential, may be incompatible with a reasonable response, or may have some relatively trivial importance, depending upon the problem posed and of course upon the nature of the element itself.

The information elements are numbered one to twenty-five for identification by the student.

Following the presentation material and the array, the manual contains a series of questions for each of which there is a data card having pre-punched control data.

Following the questions there are pages or sections of information numbered sequentially but not necessarily having any correspondence with the question numbering. This information will be corrective, corroborative, explanatory and so on in dependence upon the actual response to which it relates, it being appreciated that with the manner of constructing a response present in this teaching aid there are many response possible which can be analyzed (as will be explained) to exhibit many different degrees of understanding and misunderstanding. There is consequently a need for a large number of "follow up" commentaries.

The student makes his response with the aid of a card holder. He places the card relevant to the particular question in the holder, which locates it accurately in position under a transparent perforated sheet. The perforations cover the response data field of the card, there being twelve rows and fourteen columns. With a blunt spike which just fits the perforations the student make holes in, or "punches" those locations whose numbers coincide with those of the information elements that he thinks constitute a response. He then takes the card form the card holder and places it in the drawer 108 of the device. The drawer 108 is shut and the index wheel 105 is set at attempt number one, i.e. at A1.

The answer is then subjected to a number of tests by operation of the lever 114.

Considering the card in detail, the response data field columns 3 to 29 in alternate covers (i.e. odd numbered) columns. The twelve rows in this field are marked out in six blocks referenced A1–A6 each of two rows and each block accommodating one attempt to answer a question. There are thus twenty-eight response locations in each response block, all of which are pre-scored so that a "punched-hole" data bit can be recorded by simply pushing out the scored section of card in the appropriate location. The various card response locations are numbered, in each block, from 1 to 25 and X, Y and Z, the numbering extending from 1 to 13 on the lower row, and ending with Y, and from 14 to 25 on the upper row ending with X, Z.

The response location X in each block provides an operational control which can alter the assessment of an answer. As will be explained, punching of the X location by the student causes the omission of one or more tests which would otherwise be performed on the student's answer where the program author has incorporated this facility in the control data. An instruction or suggestion to punch the X location may therefore be given in a remedial presentation after certain kinds of failure of a question. The subsequent attempt may then be assessed less strictly, for example.

The Y and Z locations are also open to operation by the student but in this case do not affect the assessment. When a student has failed a question, and in fact also when he has "passed," he is referred to an appropriate presentation "frame" (a page or section of the manual text). It may be appropriate that he is offered auxiliary information either of explanation, in the case of failure, or of corroboration in the case of success. In the case of failure there may be, for example, alternative causes, one of which could be remedied by a more intensive fundamental explanation and one which could be remedied by, say, an example of some kind. By making these offers to the student in the remedial frame and making them available by way of the Y and Z locations respectively, further analytical information can be obtained and stored. The further remedial frames may then each refer to the alternative fault not so far examined and offer yet further, comprehensive, explanation by way of the other Y or Z location in conjunction with the existing one. The addresses of such further frames will be referred to as the Y, Z, and YZ addresses.

Column 33, between the response and control data fields, is used to store the number of the question or problem in the lesson, to which the card relates.

The control data field comprises columns 35 to 78, both odd and even, and rows one to nine. Rows one to seven are concerned with tests on various aspects of the student's response. The overall result of these tests is to provide an effectively qualitative assessment of the response, but the individual tests are performed on a quantitative basis. Each test is performed on an inclusion or omission basis. In an "inclusion" test a check is made to determine whether a tolerable number of information elements, incompatible or inconsistent with an acceptable response, has been exceeded. In an "omission" test a check is made to determine whether a minimum number of essential or desirable elements has been included. The manner in which these tests are performed will be described in further detail subsequently.

The eighth row of control data is concerned with an artifiical test having a predetermined result, purely to obtain a particular "success" address which is appropriate when all previous seven tests have been performed successfully.

The ninth row concerns a "rest" position which obtains before and after a series of tests are made. The control data in this ninth row effects a check on the circuit and requires a predetermined result in circumstances in which the circuit is operating in extreme conditions.

Regarding the columns of the control data, certain holes are pre-punched, in every card, thus column 35 is pre-punched in every row to provide a strobe signal initiating each test. Columns 36, 37 and 38 and 74, 75 and 76 in row nine are pre-punched for the purpose of the system check, and columns 71, 77 and 78 row eight are pre-punched to obtain the "success" address. Apart from these, the other punched holes shown in FIG. 2 are appropriate to the particular lesson and question.

Referring now only to the first seven rows of control data, columns 37, 38, 39 and 40 specify binary weightings 1, 2, 4 and 8 for the units of an address appropriate to the failure of a particular test, and columns 41 and 42 specify decimal weightings 10 and 20 for the "tens" of the same address. Add columns from 43 to 67 specify elments 1 to 13 of the available twenty-five elements and even columns from 44 to 66 specify the remaining elements 14 to 25.

Column 68 is allotted to the X operational facility previously referred to, a hole punched in this column permitting the functioning of the student's location X for the particular test.

Columns 69 and 70 specify that a "tens" unit and a "twenties" unit respectively, form part of the ordinary address appropriate to a failure of the particular test. Specification of these units in there columns prevents the operation of the Y and Z functions by the student and effectively leaves him with the same normal and Y addresses or with the same normal and Z addresses. This will be explained further with reference to the circuit.

Columns 71, 72, 73 and 74 specify binary weightings 1, 2, 4 and 8 as reference values against which the student selection weightings are compared as also will be explained with reference to the circuit.

Columns 75 and 77 serve as a changeover switch in the circuit: a hole is punched in one or the other column for a particular test to offset a bridge balance condition in one or other of opposite directions according to whether the test is an inclusion or an omission test. Similarly, columns 76 and 78 serve as a changeover switch to provide or other of inverse balance results according to whether the particular test is an inclusion or an omission test.

Considering the tests individually, the first row has holes punched in columns 75 and 76, thus the test is an inclusion test. A hole punched in column 71 indicates a reference value of unity. It will be shown that this indicates a minimum of unity-plus-one, i.e. two "undesirable" elements which if selected by the student to form his answer, or part of his answer, will cause him to fail that test. The "undesirable" elements two or more of which will fail the test are specified by holes punched in columns 43, 45, 47, 48, 49, 52, 55, 64, 65 and 66. It will be seen from the above correlation that these punched columns correspond to elements 1, 2, 3, 4, 7, 12, 16, 18, 24, 25. The test may therefore be symbolised as $I_2$ (1, 2, 3, 4, 7, 12, 16, 18, 24, 25) which can be read as "inclusion of any two or more out of 1, 2, 3, 4, 7, 12, 16, 18, 24, 25 results in failure of the test."

In the second control data row holes are punched in columns 77 and 78 specifying an omission test. Columns 71 and 72 are punched, specifying a reference value of three. Columns 50, 51, 53 and 60 are punched thus specifying four elements, numbers 17, 5, 6, and 22 respectively, which should preferably not be omitted from the student's response. In an omission test the reference value is given by $(m+1)-n$ where $m$ is the number of elements preferably not omitted (in this case four), and $n$ is the minimum number of omissions which will cause the test to be failed (in this case, therefore, two). This omission test can therefore by symbolised as $O_2$ (5, 6, 17, 22) which is read as "omission of any two or more of the elements 5, 6, 17 and 22 will cause failure of this test."

It will be seen that the following test can be symbolised as $I_2$ (8, 9, 10, 13, 19, 20, 23)

$$O_2 \text{ (11, 15, 22)}$$
$$O_1 \text{ (15, 17)}$$
$$O_1 \text{ (14)}$$

and $$O_1 \text{ (6, 21)}$$

Each test makes a quantitative assessment of the student's response from a particular aspect so that a substantial amount of analytical information is provided by the number of tests successfully made, the identity of the test first failed, the progress from attempt to attempt and so on.

In the first row address column 37 is punched so providing "address 1" as the normal address for failure of this test. In the second row column 38 is punched so making "address 2" the normal address for failure of this test. Similarly, the addresses specified for failure of the following tests are 3, 8, 9, 10 and 11. Test eight has a "success" address, specified by a hole punched in column 39, as "address 4."

No alternative Y, Z or YZ addresses are shown in the example of FIG. 2 but these would be made available if required by holes punched in columns 41 or 42 or both. In the case of tests six and seven, column 69 is punched to specify that the "tens" unit is part of the normal address. The holes in column 41, being already punched for the normal address, are not therefore available to obtain a Y address, so that if this were attempted, by means of the Y location in the response data field, the same (normal) address would result.

Figure 3:
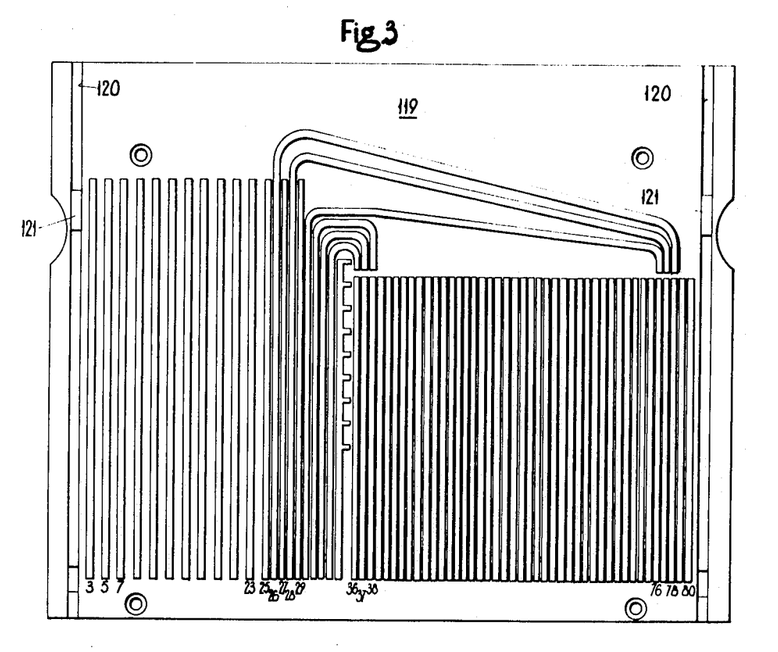
FIG. 3 is an underneath view of a contact plate against which the card is held when in position.
Figure 4:
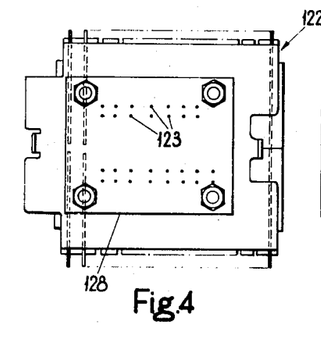
FIGS. 4 and 5 are underneath views of response and control carriages shown below their operating positions against the contact baseplate.
Figure 5:
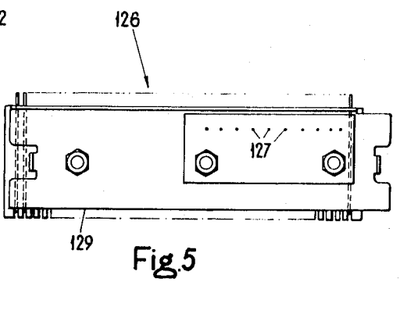

Referring now to FIGS. 3, 4 and 5, the manner in which punched holes in the data card are sensed will be described.

Immediately underneath the lid 102 of the device a contact plate 119 is mounted. This contact plate, the under view of which constitutes FIG. 3, comprises a rigid printed circuit board having an exceptionally thick insulating substrate. The printed circuit comprises contact strips or tracks corresponding to columns of the data card of FIG. 2. As shown in FIG. 3, the front edge of the contact plate 119 corresponds to the first row of the data card. Side channels 120 in the plate 119 receive the upturned edges of the card drawer 108 while stops 121 in these channels limit the withdrawal of the card drawer.

Near the centre of the contact plate, nine strobe contacts can be seen lying in a column corresponding to column 35 of the data card. When the card is inserted in the drawer 108 and the drawer pushed home the nine punched holes of column 35 of the card are superimposed (from underneath) on the nine strobe contacts. The uppermost strobe contact in FIG. 3, corresponding to row nine of the control data, is seen to be aligned with separated portions of the contact tracks of columns 36, 37, 38, 74, 75 and 76. These same separated portions in row nine are also seen to be connected permanently to the contact tracks of columns 33, 32, 31, 30, 28 and 26 respectively. The reasons for these connections will be seen subsequently with reference to the circuit. Connections to the contact plate 119 are made (permanently) at the row one ends of all the tracks and (temporarily) by means of spring contacts bearing on the contact tracks through the various holes punched in the card.

FIGS. 4 and 5 show a response carriage and a control carriage carrying spring contacts for the response tracks and the control tracks respectively. The response carriage 122 is partly shown in position in FIG. 6: it comprises two rows of cantilevered spring wire contacts mounted in a nylon comb. There are fourteen contacts in each row the contacts being aligned with the odd columns 3-29. The two rows of contacts are spaced at the same pitch as the card rows so that the two response data rows in each attempt block A1, A2, etc. can be read in unison. The spring wire contacts are connected to pins 123 on the back (i.e. the underside) of the response carriage, the pins 123 then being wired by flying leads to the printed circuit board of FIG. 7.

With regard to FIGS. 2 and 3 it will be appreciated that no spring contact is made to the contact tracks of columns 26, 28, 30, 31, 32, 33 and 34 these being used solely for permanent circuit connections. (Column 33, although punched for the question number, is not sensed in operation.)

The control carriage 126 is of similar construction to the response carriage 122 but has a single row of forty-four spring wire contacts aligned in operation with the columns 35-78. The spring contacts are connected to contact pins 127 on the back of the control carriage which are in turn connected together and by flying leads to the small printed circuit board, the "bridge board," of FIG. 7.

The response and control carriages 122 and 126 include respective metal plates 128, 129 on which the nylon combs are mounted. These plates have end lugs which engage in nylon bearing blocks 130 and 131 (shown in FIG. 7). The blocks 130, 131 are a sliding fit on respective pairs 135, 136 of runners mounted between front and back on the main frame 103. The two carriages can thus scan their respective data fields.

Each pair of nylon bearing blocks 130 (131) has a steel driving shaft 141 (142) extending between and has a spur gear 137 (138) at each end of the shaft. The spur gears engage a pair of racks 139 (140) thus maintaining the shafts 141 and 142, and consequently the contacts of the response and control carriages accurately aligned with the data rows.

The shaft 141 of the response carriage is rotated, thus driving the response carriage across its data field, by the index wheel 105 which is mounted on one end of the shaft 141. Mounted across the main frame at each end of the shaft 141 is a notched plate 145 in which a sprung roller (not visible) mounted on the shaft, engages. The six attempt positions of the response carriage are thus determined by "clickstop" location.

The control carriage is energised manually but is driven automatically. The driving shaft 142 is encased in a helical spring 146 which is locked to a collar 147 on the shaft at the inner end of the spring, the collar 147 also being locked to the shaft 142. Thus the inner end of the spring 146 rotates with the shaft. The outer end of the spring 146 is trapped in the mounting of the nylon bearing block 131 and so cannot rotate, the spring biasing the carriage into a position in which the contacts of the control carriage are aligned with data row nine.

The control carriage scans the control data field by being driven manually beyond the first row position, being trigger released at that point and scanning the field on the return travel driven by the helical spring 146. Forward drive of the carriage is effected by a driving arm 148 fixed to a driven spur wheel 149. A driving spur wheel 150 is locked to a catch plate 154 with which it rotates. The operating lever 114 is mounted on a plate 155 rotatable on the same axis as upper spur wheel 150 and catch plate 154. The lever plate 155 and catch plate 154 are coupled by a latch which is disengaged after joint rotation of the lever plate 155 and catch plate 154 causes the complete forward travel of the control carriage. The control carriage is then released and driven back by the helical spring 146 while the operating lever 114 returns under its own return spring. When both catch plate 154 and lever plate 155 have returned to their rest position, the latch re-engages ready for the next driving operation.

The return, scanning motion of the control carriage is required to be moderately uniform and this is achieved by an air dashpot 156. One bearing block 131 of the control carriage is coupled to a carbon piston inside the brass tube of the "dashpot." Air is expelled through a diaphragm valve in one end of the dashpot on the forward travel of the control carriage, the air leaking back through a slot in the piston on the return travel.

On initial operation of the lever 114 there is a short lost motion period during which make and make-before-break contacts 157, 158 are actuated by an intermediate lever. This effects both switching on of the circuit supplies and a short reset pulse.

A further make contact 159 mounted on the main frame 103 is operated briefly by the control carriage just before being trigger released. This also produces a brief reset pulse.

The space shown at the right hand end of the lid in FIG. 6 is reserved for battery power supplies for the circuit.

A further detail of some practical importance shown in FIG. 6 is a spring latch 160 which engages a notch in the side wall of the drawer 108 just prior to the drawer being fully closed. The latch then biases the drawer firmly closed so preventing any misalignment of data card and contact carriages. Two such latches are provided, one at each end.

Figure 7:
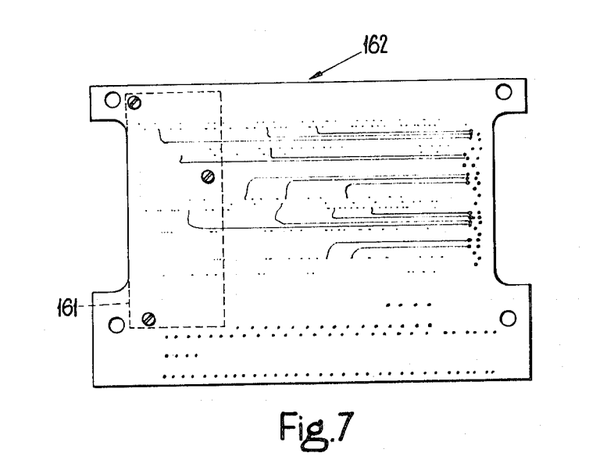
FIG. 7 is an underneath outline view of a printed circuit board mounted below the mechanism of FIG. 6.

FIG. 7 shows in broad outline two printed circuit boards for the device. The smaller one 161 carries a bridge circuit in which the comparison between student choice and reference value is made, and the larger one 162 carries the two banks of resistors which represent the two sides of the balance, and in addition the decoding circuitry for providing the address indication. These two printed circuit boards are mounted under the mechanism shown in FIG. 6.

Figure 9:
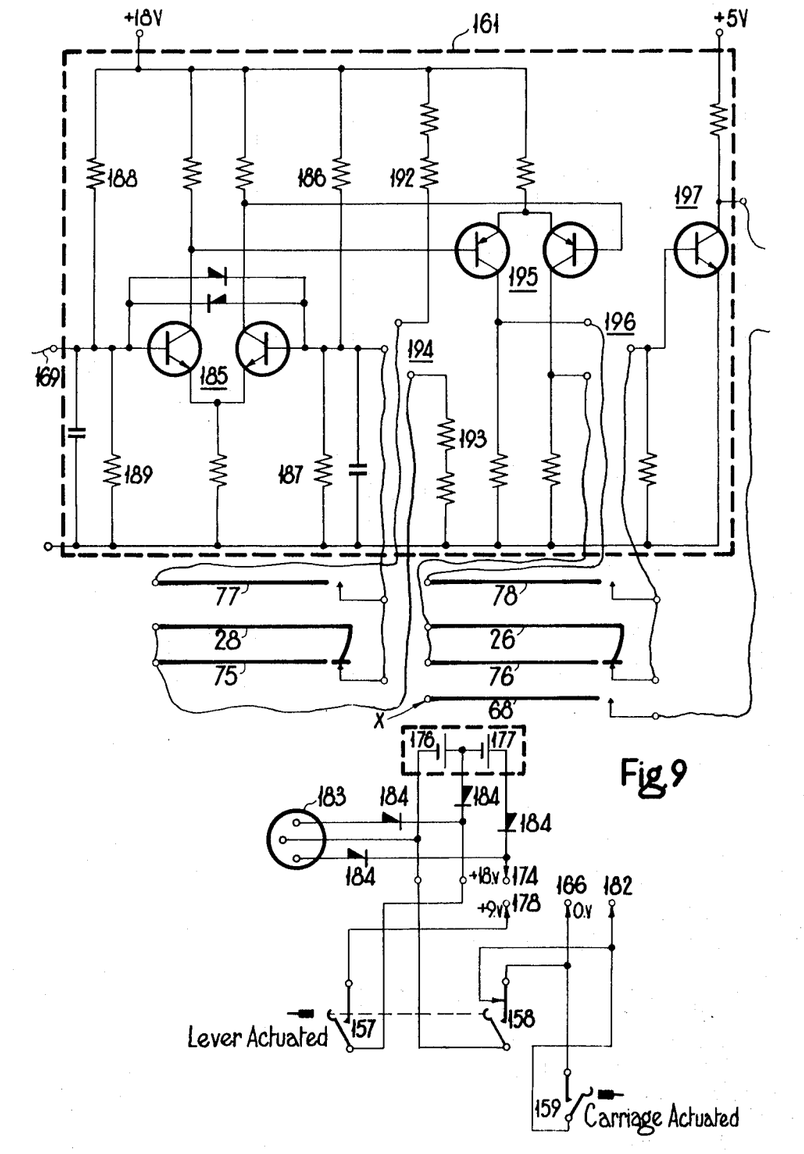
Figures 10, 11:
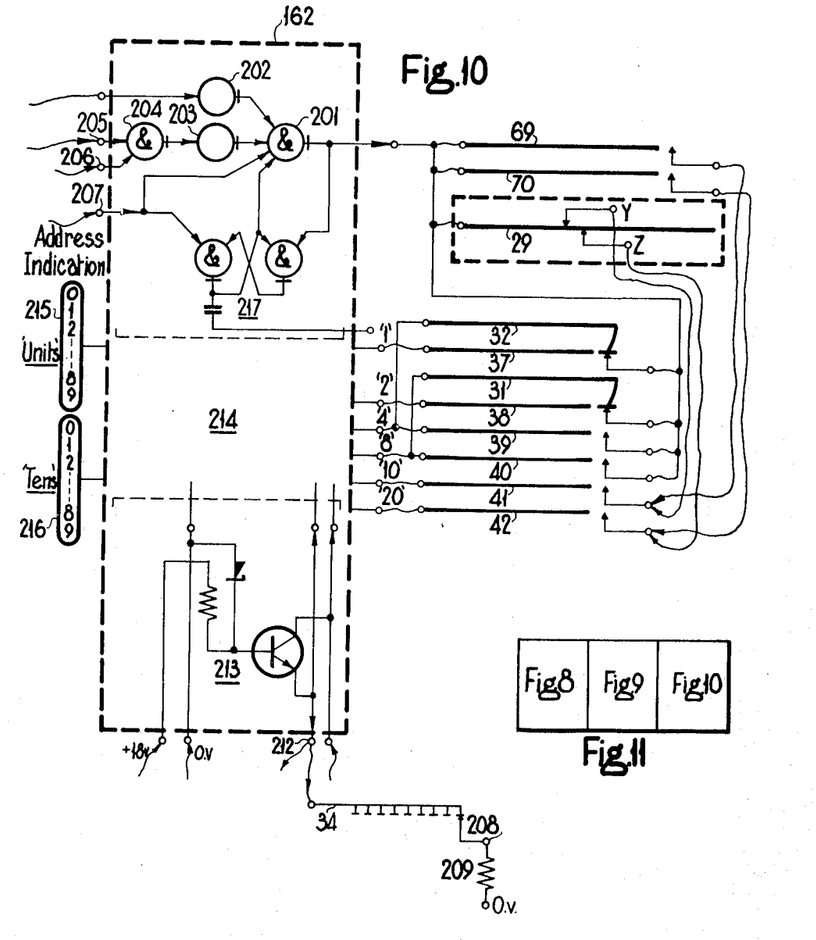

The circuit and its operation will now be described with reference to FIGS. 8, 9 and 10 assembled as shown in FIG. 11.

Figure 8:
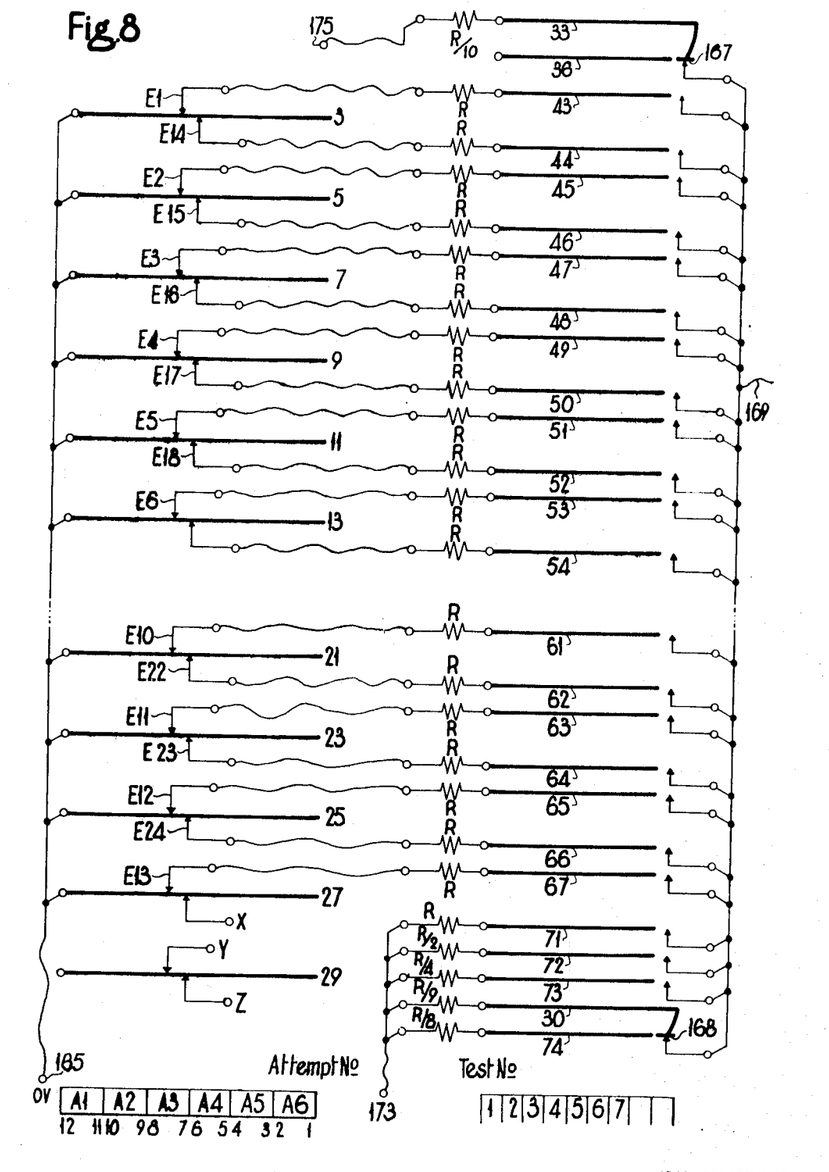
FIGS. 8, 9 and 10 are sections of a circuit diagram of the device, to be assembled as shown in FIG. 11.

FIG. 8 shows the circuit of the response and control carriages and the contact plate 119. The response column tracks on the contact plate are shown as horizontal bars on the left-hand side referenced 3 to 29 (odd-numbers) in accordance with the column number. The response carriage contacts are shown in engagement with the column tracks at a position along the tracks appropriate to attempt number three, that is, A3. The contacts are referenced E1-E25 identifying the information elements with which the particular contacts are associated. Although each carriage contact (E1-E25) is shown as engaging the corresponding column track, the actual connection is dependent upon the presence of a hole in the appropriate location in the response field of the data card.

The response carriage contacts E1-E13 and also contact Y are shown aligned with row eight in attemp block A3, while contacts E14-E25 and also contacts Y and Z are shown aligned with row seven.

Response column tracks 3-27 (odd numbers) are connected together and to a "0" volt terminal 165 which is connected to a "0" volt source terminal 166 in FIG. 9. Column track 29 is not so connected but is employed in FIG. 10 as will be explained.

Contacts E1-E25 are connected by way of flying leads to respective resistors of unit value R (which will also be used as a reference) in a resistor bank mounted on the printed circuit board 162.

The horizontal bars at the right hand side of FIG. 8 represent the control column tracks of the contact plate 119 of FIG. 3 and are referenced in accordance with the column number. Certain of the control column tracks have separate functions from those of FIG. 8 and are shown elsewhere in FIGS. 9 and 10. At the right hand end of the control column tracks the control carriage contacts are shown, mostly out of engagement with their respective tracks, in the ninth row or rest position. Tracks 36 and 74 (in FIG. 8) are shown to have detached portions 167 and 168 respectively (shown and previously described with reference to FIG. 3), which are engaged by the corresponding control carriage contacts (as shown) in the rest position. These detached portions 167 and 168 are permanently connected by printed conductor to column tracks 33 and 30 as shown in FIG. 3. All of the control carriage contacts of FIG. 8, that is, for columns 36, 43–67, 71, 72, 73 and 74 are connected permanently together and by flying lead 169 to the input of the bridge circuit board 161.

The bank of resistors R on the board 162 are connected to the control column tracks 43–67 by flying leads, so producing the correlation previously described with reference to FIG. 2 that elements E1–E13 correspond to odd column tracks 43–67 and elements E14–E25 correspond to even column tracks 44–66.

A further bank of reference resistors on the board 162 are connected by flying leads to the column tracks 71, 72, 73, 74 and 30, these resistors having values R, $R/2$, $R/4$, $R/8$ and $R/9$ respectively the other end of the resistors being together connected to a terminal 173 which is in turn connected to an 18 volt source terminal 174 in FIG. 9. A further resistor of value $R/10$ is connected by flying lead to column track 33 and to a "0" volt terminal 175 which is connected to the "0" volt source terminal 166.

It will be apparent then, that in the rest position shown, of the control carriage, when the supply is connected to terminals 173 and 175, the flying lead 169 input to the bridge circuit 161 is connected to a potential divider comprising resistors $R/9$ and $R/10$ so as to acquire a potential slightly less than half-way between 0 and 18 volts and approximately, say 8.5 volts. This will be seen to be just below the balance input potential.

It will be seen, referring to FIG. 2, that the control carriage contacts will always (in the rest position) engage the track portions 167 and 168 by virtue of punched holes in the appropriate locations.

Considering now the lower part of FIG. 9, this shows two series connected 9 volt batteries 176, 177 which are directly connected to an 18 volt source terminal 174. A 9 volt connection is made to a 9 volt source terminal 178 by way of a make contact 157 previously referred to as being actuated immediately upon operation of the lever 114. Operation of the lever 114 thus corrects a 9 volt lead to the circuit. The negative battery connection, providing a "0" volt supply, is made to the "0" volt source terminal 166 by way of the make part of a make-before-break contact 158 gauged to the make contact 157. Operation of the lever 114 thus completes the 0, 9 and 18 volt supplies to terminals 166, 178 and 174 respectively.

A reset terminal 182 derives a 0 volt reset pulse by way of the make and break parts of contact 158, the reset pulse therefore being produced on the initial operation of the lever 114. An additional reset pulse is provided by a make contact 159 briefly operated at the end of the forward travel of the control carriage.

A socket 183 is provided in the casing of the device for correcting an external power supply. In order that no excessive currents should flow, when both sources are connected, rectifier diodes 184 are connected appropriately in the 9 and 18 volt leads so that only the greater voltage source (even though nominally equal) will be employed.

Referring now to the bridge circuit 161 this comprises a long-tailed pair transistor stage 185 having fixed bridge arms 186, 187 and input arms 188, 189. Any resistor R selected by the response and control data (and thus connected between the "0" volt terminal 165 and the bridge input 169) is therefore connected in shunt with the arm 189. Similarly any of the reference resistor bank R, $R/2$, $R/4$ etc. selected by the control data are connected between the 18 volt terminal 173 and the bridge input 169 and thus in shunt with the bridge arm 188. Thus excessive inclusion of resistors R by the student will lower the bridge input potential and excessive omission will raise the bridge input potential.

In order that very critical decisions do not have to be made by the bridge a resistor of such value as to cause a potential shift half that of a unit resistor (R), is connected in shunt with either the upper or lower fixed arms 186, 187. This is done by connecting either resistor 192 or 193 to the junction of arms 186, 187 by means of a changeover switch 194 which is provided by column backs 75 and 77 and the corresponding control carriage contacts. In the rest position control contact 75 is, the data card permitting, connected to the detached portion of column track 75 which is permanently connected to column track 28 which in turn is connected to offset resistor 193. It can be seen that resistor 193 should be switched in to provide for an "excessive inclusion" test by moving the actual balance condition slightly into the field of "excessive omission." A definite excess of included elements is then needed to provide a change in the bridge output to the "excess inclusion" condition. The offset effect of resistor 193 is only half that of one unit resistor R so that no wrong indication can be given.

Resistor 192 is similarly required to be switched in for an excessive omission test, column track 77 and the associated control carriage contact providing the necessary switch, again with the data card permitting.

The bridge output at the collectors of the transistors of stage 185 is applied to a further long-tailed pair 195 the outputs of which are applied to a changeover switch 196. This enables a positive-going output to indicate failure irrespective of whether the test is for omission or inclusion. The switch 196 is formed by column track 78 and its associated control carriage contact and column track 76 and its associated control carriage contact. Thus a punched hole in column 76 specifies an inclusion test bridge output and a punched hole in column 78 specifies an omission test bridge output. A permanent hole in the rest position of column 76 specifies an inclusion type test for the system test of row nine. The detached portion of column track 76 is permanently connected to column track 26 (as shown in FIG. 3) to specify the inclusion test for this position.

The output of the changeover switch 196 is applied to the decoder circuitry of the board 162 by way of a buffer amplifier 197. The decoder circuitry includes a four-input AND-gate 201 which is enabled by positive signal levels on its inputs. An inverter gate 202 is therefore connected between the buffer amplifier 197 output and the gate 201. A second input to gate 201 is derived by way of an inverter 203 from an inhibit gate 204. An enabling input for this gate is derived from terminal 206 which is connected to the control carriage contact of column 35, the strobe column for which there is a punched hole in all of the nine control rows. The strobe contact is connected to a "0" volt terminal by way of a resistor 209. Column track 32, which is common to all the strobe contacts of column 33 (see FIG. 3), is connected to a 5 volt supply terminal 212 of a supply circuit 213.

When the strobe contact engages the column 33 track the strobe terminal 208 acquires a 5 volt enabling potential in respect of gate 204. In between these strobe positions terminal 208 will go down to zero volts and gate 204 will be disabled.

The second, inhibit, input to gate 204 is derived from a terminal 205 which has a flying lead to the control carriage contact of column 68. Column track 68 is connected to the response carriage contact of column track 27. A hole punched in the X location of the response field together with a pre-punched hole in column 68 for a particular test imposes a zero volt inhibiting signal at terminal 205 and on gate 204. No strobe pulse for that particular test is then passed by gate 204 and the test is effectively by-passed. As mentioned previously this is a facility which can be "offered" to the student in a remedial frame, the "offer" being effected by a pre-punched hole in column 68. This is one way in which the control data can be modified by the operator, that is, in this case, the student.

The remaining two inputs to gate 201 have inhibit functions. The first is derived from the reset terminal 207 which is connected to the reset source terminal 182. Thus the gate 201 is inhibited in the rest condition almost immediately upon movement of the lever 114. This inhibition is necessary because the rest condition is one of enforced failure and the resultant address would be ambiguous if it arose before resetting of the various binary elements. Thus an output from gate 201 is inhibited until after the occurrence of the reset signal.

Immediately following the application of the reset signal and before movement of the control carriage off the rest position, the gate 201 is enabled and the artificial fail condition of that position produces an output from gate 201. This output is transmitted to the detached portions of column tracks 37 and 38 and then by way of the permanent tracks 32 and 31 to the "4's" input and the "8's" input of the binary/decimal decoder 213. The binary inputs 1, 2, 4 and 8 to the decoder 214 are used exclusively for the "units" decade 215 of the address indicator, and the decimal inputs 10, 20, are used exclusively for the "tens" decade 216. A combination of the binary units "4" and "8," equivalent to twelve, is therefore invalid as a "units" value and the zero, units indication produced on initial reset disappears leaving no "units" lamp alight. This change, from a "00" address indication (on reset), to a "0." indication still in the rest position indicates a successful check on the system.

Before considering the continued operation of the lever 114 the remainder of the logic circuitry of the board 162 will be considered.

A fourth input, having an inhibiting function, to the gate 201, is derived from a lock-out binary element 217 formed of two gates. In the lock-out state of this binary element an inhibit signal is applied to the gate 201, the inhibit signal being removed in the reset state and triggered by the reset signal from terminal 207. There is also a feedback connection from the output of gate 201 to the binary element 217 to trigger it to its lock-out state. Any "fail" output signal from gate 201 will be of very short duration therefore, because it will immediately trigger the lock-out binary element 217 to its lock-out state in which the gate 201 is disabled.

Immediately, therefore, that the inhibiting reset signal is removed from the gate 201 and the artificial "fail" output is produced by the gate, this same output triggers the lock-out binary 217 to its lock-out state and the artificial "fail" output of gate 201 is removed. No further change of the address indication from its "0." value can occur until a further reset pulse should occur.

On driving the control carriage forward off the rest position by continued operation of the lever 114, nothing further occurs until the carriage actuates the make contact 159 just prior to its being triggered to scan the control data. A further reset pulse then arises at terminal 207 as a result of which the lock-out binary element 217 is reset to enable the gate 201. The reset pulse is also applied to the various binary elements of the decoder, the details of which have not been shown as it is standard circuitry, so resetting the indication to "00."

The carriage is then released to scan the control data the reset pulse being removed as the contact 159 opens.

At each control data row the student's data, as selected by the holes of the control data, is compared with the reference value specified and a bridge output obtained. At any "fail" indication as applied by the buffer amplifier 197 to the gate 201, the strobe pulse arising will enable the gate 201 and produce the "fail" output. This immediately triggers the lock-out binary element 217 and inhibits any subsequent "fail" indication. The address specified for failure of this particular test is achieved by an appropriate combination of pre-punched holes in columns 37, 38, 39, 40, 41 and 42. As previously explained, if columns 41 and 42 are part of this "normal" remedial address, holes will also have been punched in holes 69 and 70 correspondingly to remove control of the address from the student who would otherwise have access to the "10's" and "20's" units by way of the Y and Z locations.

The address indication in respect of this particular failure will remain illuminated while the student holds the lever 114 down (so maintaining the battery supply by way of contacts 157 and 158). On referring to this address in the study manual the student will have remedial information presented appropriate to the particular failure. He may then be instructed to make another attempt, or alternative causes of his failure may be suggested to him with corresponding instructions to punch the Y or Z locations and re-assess the response to provide auxiliary addresses and presentations appropriate to the suggested causes. The important effect of this is both to give him a choice of further information and to record his choice for subsequent analysis.

As a further method of exploring a particular failure, a remedial presentation may give information and additionally suggest that the student should punch location X if, for example, his difficulty has some specified characteristic. By punching the location X and re-inserting his card for assessment a particular test in the series can be omitted so that a certain difficulty associated with that test can be set aside for performance of subsequent tests. Again the students' action is recorded and more penetrating exploration of his comprehension is permitted.

When a further attempt is made by the student he inserts his card and operates the index wheel 105 to move the response carriage to the next attempt block. An assessment of the further attempt is then made as before by operation of the lever 114.

If there should be no failure of any of the seven real tests an enforced "failure" of the eighth is effected by the control data simply to provide a "fail" signal for encoding. The address specified for this row will in fact be corroboration or extension of the students' existing grasp of the question.

Clearly in seven omission and inclusion tests on specific aspects of a students' response a fairly exhaustive overall qualitative assessment can be obtained on the basis of the individual quantitative evaluations.

It is apparent that all of the presentation material, questions, comments, further information etc. is open to examination by the student. However this material is likely to be very extensive and difficult to correlate with particular questions. There is therefore little to be gained by reading through it for clues. The decoder 214 may, instead of operating a numeric address, indicator, directly control an automatic projector and in this case no searching through the material is possible.

The tests performed in the device described have each been wholly inclusion or wholly omission tests with a remedial presentation available for each individual test. In the above data processing device but employing slightly modified circuitry combined inclusion/omission tests can be performed. In this modification strobe pulses are gated into separate streams, those for "failed" tests and those for "passed" tests. Two binary elements are arranged as a shift register. The first is triggered to an "ON" state by the trailing edge of a "fail" strobe pulse and reset by the leading edge of a "pass" strobe pulse. The second is steered by the first and is triggered to its "ON" state by the trailing edge of a "fail" strobe pulse and reset by the leading edge of a "pass" strobe pulse. The result is that the second binary element is only set "ON" by two successive failures.

Signals from the "ON" states of the two binaries can then be used by way of alternative column tracks and control carriage contacts to provide single or compound test outputs for decoding. A compound test could then be specified in the control data for two opposite type tests, the appropriate address being indicated only in the case of failure of both. A single address could be produced for the other three possibilities: pass/fail, fail/pass and pass/pass the common presentation indicating further addresses by way of the Y, Z and YZ locations appropriate to the particular combination. Extension of this principle to multiple tests is of course then possible.

Many modifications of the above device are possible, the card need not be sensed directly by electrical contacts but may operate remote contacts by mechanical sensing of the punched holes. The mechanical sensors may be static, e.g., one sensor per bit, or may scan as in the basic arrangement.

In a simpler version of the device the numeric display is omitted and consequently the decoder store and its associated gates and bistables and the strobe pulse signals are omitted. Each test position would then have an associated lamp and reference letter and there would be a code after each question relating the reference letters to the associated section number for corrective or other information. Operation of the control carriage could be manual rather than automatic. There might then be an instruction to note only the first lamp and corresponding information in case several tests were made and produced corrective indications.

In another modification a paper tape is used as the data sheet. In this modification the device is a box with a lid and a plurality of sliding keys corresponding to the elements of the array. Each key has two positions and in each position it forms a jig for a punch which it carries over the paper tape. When the lid is closed the punches operate individually in one of the two positions so producing two rows of holes, one row constituting elements inserted and the other elements omitted in the students response. A sliding lever protruding from the side of the box is then pushed home and by mechanical gearing and levers drives a carriage and contacts over the tape so making the various tests as before, the control data being entered on a separate card.

In a further modification the response data is entered on one card and the control data on another, each having its own drawer and contact plate.

It has been found convenient to describe an embodiment of the invention in use as a teaching aid, however it will be clear that the invention is applicable to the communication of structured information in any field where material common to two parties can be arranged in structured form and responses or, more generally, statements can be constructed by one partly and assessed by or for the other.

I claim:

1. A data processing device, a data card for use with said device, said data card having a first data field and a second data field, each said data field comprising holes punched selectively in data bit locations, means responsive to the data in said first data field for selecting a plurality of data bit locations in said second data field, means responsive to data in said first data field for providing an electrical reference quantity, means responsive to data in said second field for providing an electrical weighting unit in respect of each data bit location of said plurality of data bit locations having a predetermnied one of the data bit values, and balance circuit means for comparing the aggregate value of said weighting units with said reference quantity and producing an output signal dependent upon the result of the comparison.

2. A data processing device according to claim 1 wherein said balance means has mutually inverse outputs and wherein means responsive to data in said first field selects one of said outputs.

3. A data processing device according to claim 2, including means for scanning a plurality of data words in said first data field, a said comparison being made in respect of each said data word.

4. A data processing device according to claim 3 including means responsive to data included in each said data word to produce an address indication in the condition of a predetermined result of each said comparison.

5. A data processing device according to claim 4 including means responsive to the production of any said address indication to inhibit any further address indication.

6. A data processing device according to claim 3 including circuit means responsive to data in said first field to produce an address indication in the condition of a predetermined combination of results of a plurality of said comparisons.

7. A data processing device according to claim 4 including circuit means responsive primarily to control data included in said first data field and secondarily to operational data included in one of the two data fields, to produce an address indication in the condition of a predetermined result of said comparison, said address indication being one of a plurality of address indications, said control data specifying that a choice of address indications is available and said operational data specifying the selected address indication.

8. A data processing device according to claim 3 including circuit means responsive to a system-test data word in a predetermined scan position of said first data field to produce a system-test indication in the event of a predetermined result of the comparison made in the said scan position.

9. A data processing device according to claim 3, including first and second contact carriages mounted for scanning said first and second data fields respectively, spring contacts on said contact carriages, a contact plate having surface contacts which cooperate with said spring contacts, said data card lying between said contact plate and said contact carriages and permitting engagement between said spring and surface contacts only at hole locations, the two values of a data bit being represented by an electrical connection between a said spring contact and a said surface contact, and by the absence of such connection, respectively.

10. A data processing device according to claim 9, wherein the scan position of said second contact carriage in said second data field is manually selectable.

11. A data processing device according to claim 10, including means for driving said first contact carriage to scan the data words of said first data field automatically.

12. A data processing device according to claim 9, wherein said balance circuit means comprises a bridge circuit having a first bank of resistors selectively connected in parallel with one arm thereof, a second bank of resistors selectively connected in parallel with an opposing arm thereof, each resistor of said first bank being connected in series with a said spring contact of each of said first and second contact carriages, and each resistor of said second bank being connected in series with a said spring contact of said first contact carriage, those resistors of said first bank having closed contacts in said first and second contact carriages being balanced against those resistors of said second bank having closed contacts in said first contact carriage.

13. A data processing device according to claim 9 for use as a teaching aid and wherein said first data field comprises a plurality of pre-punched control data words and said second data field comprises pre-scored response data bit locations for punching by a student, the device having associated therewith means identifying each said response data bit with a respective item of information relevant to the lesson and question, an answer by a student being entered as a response data word in said second data field by punching a selected plurality of said pre-scored response data bit locations, the answer being assessed by a said comparison of said response data word with each of said control data words and an address indication being produced in response to the result of at least one said comparison, said address indication being a reference to information appropriate to said result.

References Cited
UNITED STATES PATENTS

| | | | |
|---|---|---|---|
| 2,527,469 | 10/1950 | Vernon et al. | 35—48 RX |
| 3,151,403 | 10/1964 | Sinex | 35—9 R |
| 3,221,418 | 12/1965 | Hoernes et al. | 35—9 R |
| 3,227,860 | 1/1966 | Blodgett | 235—61.11 C |
| 3,346,970 | 10/1967 | Charbonneaux et al. | 35—48 B |

WILLIAM H. GRIEB, Primary Examiner

U.S. Cl. X.R.

35—48 B; 235—61.6 E, 61.11 C, 61.12 R